United States Patent
Kocan et al.

(10) Patent No.: US 8,233,411 B2
(45) Date of Patent: Jul. 31, 2012

(54) ENHANCED SYSTEM FOR CONTROLLING SERVICE INTERACTION AND FOR PROVIDING BLENDING OF SERVICES

(75) Inventors: Kristin F. Kocan, Warrenville, IL (US); William D. Roome, Murray Hill, NJ (US)

(73) Assignee: Alcatel Lucent, Paris (FR)

( * ) Notice: Subject to any disclaimer, the term of this patent is extended or adjusted under 35 U.S.C. 154(b) by 2080 days.

(21) Appl. No.: 11/231,166

(22) Filed: Sep. 20, 2005

(65) Prior Publication Data

US 2007/0201665 A1    Aug. 30, 2007

Related U.S. Application Data

(63) Continuation-in-part of application No. 11/089,394, filed on Mar. 24, 2005, now abandoned.

(60) Provisional application No. 60/627,271, filed on Nov. 12, 2004.

(51) Int. Cl.
*H04M 3/42* (2006.01)
(52) U.S. Cl. ......... 370/265; 709/246; 717/162; 717/171
(58) Field of Classification Search .................. 370/352, 370/473, 474; 717/162, 171, 170
See application file for complete search history.

(56) References Cited

U.S. PATENT DOCUMENTS

| | | | | | |
|---|---|---|---|---|---|
| 6,223,202 | B1* | 4/2001 | Bayeh | ............................ | 718/102 |
| 7,450,566 | B2* | 11/2008 | Wong | ............................ | 370/352 |
| 7,529,824 | B2* | 5/2009 | Joseph | .......................... | 709/223 |
| 7,814,470 | B2* | 10/2010 | Mamou et al. | ................ | 717/162 |
| 2003/0140339 | A1* | 7/2003 | Shirley et al. | ................. | 717/171 |
| 2004/0068586 | A1* | 4/2004 | Xie et al. | ...................... | 709/246 |

* cited by examiner

*Primary Examiner* — Robert Wilson
*Assistant Examiner* — Mohamed Kamara
(74) *Attorney, Agent, or Firm* — Fay Sharpe LLP

(57) ABSTRACT

A service broker system is presented for mediating events or messages to be sent to or received from a plurality of applications to control service interaction and to provide service blending in a communications system. The service broker system includes steplet functional components that determine a desired mediation for feature interaction or service blending associated with an event or message, along with a message manager component with a dispatcher for the steplet functional components, where the message manager creates and maintains a unique message object for a received request message. A user and end point data manager component is provided to obtain user data and endpoint data and to bind attribute data to a user ID associated with a current service session, and a session context component for binding attribute data to session ID associated with the current service session. In one embodiment, the system includes two or more message manager components individually associated with a different message type.

20 Claims, 6 Drawing Sheets

ENHANCED SYSTEM FOR CONTROLLING SERVICE INTERACTION AND FOR PROVIDING BLENDING OF SERVICES

REFERENCE TO RELATED APPLICATION

This application is a continuation-in-part application of prior application Ser. No. 11/089,394, filed Mar. 24, 2005, now abandoned, entitled METHOD FOR PROVIDING FEATURE INTERACTION MANAGEMENT AND SERVICE BLENDING, and also claims priority to and the benefit of U.S. Provisional Patent Application Ser. No. 60/627,271, which was filed Nov. 12, 2004, entitled METHOD FOR PROVIDING FEATURE INTERACTION MANAGEMENT AND SERVICE BLENDING, the entirety of which are hereby incorporated by reference.

FIELD OF THE INVENTION

The present invention relates to communication systems in general, and more particularly to systems for controlling service interaction and for providing blending of services.

BACKGROUND OF THE INVENTION

Controlling interactions between features and between services has historically been a very challenging area. Within telecommunication switching systems, potential interactions are examined and the desired interacting behavior is determined as part of feature design and development. This method of controlling interactions lacks flexibility and per-user customizability. As the "Intelligent Network" architecture was deployed in telecommunication networks, features were separated from the connection control, which is effected by telecommunication switching systems, to a services layer. Feature interaction control was partially provided by the telecommunication switching system by managing triggers that were used to activate a feature in the services layer. This control often was not sufficient and a new sub-layer between the services layer and the call/connection control layer became useful for feature interaction management. The feature interaction management was controlled by provisioning, typically on a per-user basis. This method was more flexible, but still was typically limited to static sequencing of features or services.

The newer service architectures for communications, applicable to telecommunications and communications using other media types (e.g., data and video), retain the separation of services and call control; in fact, this separation is a major feature of these service architectures. Feature interaction management on a small-grained level could be incorporated within application servers supplying multiple features much as feature interaction management was provided in telecommunication switching systems. Although additional customization is typically provided for some of the interactions by such application servers, the customizing control is limited to the features for which it is provided, and the options provided by the application server manufacturer.

Additional feature interaction management can be provided by the call/connection control system, which is typically a SoftSwitch-like system. This feature interaction management may be a simple trigger management mechanism, such as with the Intelligent Network, or it may be more sophisticated such as in the Serving Call Session Control Function (S-CSCF) of the IP Multimedia Subsystem (IMS) architecture of 3GPP. In the latter case, "initial filter criteria" and "subsequent filter criteria" augment the trigger management significantly. However, the result still is restricted to largely static sequencing of application servers, with any dynamic component determined by the call control message stimulating feature activation. Additionally, each filtering rule is independent so that chaining of rules is not supported, rules are applied per-subscriber so that interactions between multiple subscribers are not dealt with, and each session is viewed as an independent entity so that multi-session awareness is not supported.

To allow more expansive feature interaction management, the IMS standards define a function in the sub-layer of the services layer between call/connection control and the services layer proper for feature interaction management. This function is termed "Service Coordination and Interaction Manager" (SCIM). The precise operation and capabilities of the SCIM are not defined in the standards, nor are the means by which it would be configured.

In addition to feature interaction management, there is a desire to simultaneously leverage investment in service infrastructure and provide new service offerings by blending existing services in novel ways. The SCIM function or similar function at the sub-layer between the services layer proper and the call/connection control layer could be configured or augmented to provide such a capability. The combination of feature interaction management and service blending to provide new capabilities and enriched end-user experiences will be referred to as "service brokering."

The shortcomings listed above that limit flexibility and dynamic ability, and several related limitations are difficulties that restrict service brokering capabilities and utility. There are also several additional associated difficulties that need to be addressed for fully-effective service brokering. A first associated difficulty is that interactions and service blendings for the same set of services are not typically identical. Different individuals and even different conditions for the same individual may require different interaction control or blending. A second difficulty is that optimal interactions and service blendings may require information outside of events that invoke the services. These can include Presence, Location, policies, user information, end point information, previous events and other state information, and network information. A third difficulty is that services may be short-lived. Replacement of a service providing a certain capability by another service offering to some extent the same or similar capability may be frequent, potentially affecting interaction and blending mechanisms. A fourth difficulty is that interactions and service blendings that involve services other than communication services may be desired. Examples of such services include web services and special purpose application servers that do not utilize typical communication protocols. A fifth difficulty is that future needs cannot be predicted. Conventional mechanisms to provision or otherwise configure feature interaction control and service blending, such as provisioning and graphical user interface configurators, are potentially limiting since the designers of the mechanisms would not be able to foresee all desired interactions and blendings.

SUMMARY OF THE INVENTION

A summary of one or more aspects of the invention is now presented to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter.

Service broker systems are provided in accordance with one or more aspects of the invention for mediating events or messages to be sent to or received from a plurality of applications to control service interaction and to provide service blending in a communications system, by which one or more of the above mentioned prior art shortcomings may be addressed. The service broker system includes steplet functional components that determine a desired mediation for feature interaction and/or service blending associated with an event or message, as well as one or more message manager components with a dispatcher for the steplet functional components. The message managers create and maintain unique message objects associated with a received request message, and can be tailored for a given message type, including but not limited to SIP messages, requests delivered over HTTP, FTP, or similar protocols, RPC requests, XML messages (including SOAP, XML-RPC, and other specialized XML messages), J2CA, GDI (e.g., interface into Intelligent SCP from the IN or Intelligent Network architecture), Transaction Capabilities Application Part (TCAP) messages (e.g., interface into legacy SCP from the Intelligent Network architecture), etc. A user and end point data manager component is provided to obtain user data and endpoint data and to bind attribute data to a user ID associated with a current service session, and a session context component or other means are provided for binding attribute data to session ID associated with the current service session.

The broker systems provide service interaction control and blending that can involve services other than communication services, and provides a modular architecture that interacts with application servers generally while supporting application server change-out with preservation of application server I/O behavior without requiring service broker system modification through the use of steplet functional components. An Application Programming Interface (API) is used for configuration of feature interaction management and service blending to provide configuration flexibility that may be implemented so as to do anything a programming language (e.g., Java, etc.) can do (e.g., operations that can be expressed logically, including interfaces to sources of information outside of the initial events or messages that invoke the services). In this regard, a steplet engine may be implemented that corresponds to the API and which provides common functions required for feature interaction management and service blending. The service broker systems of the invention may be advantageously employed to facilitate configuration of feature interactions and service blendings, wherein the service broker system functions may include message handling, structure for attribute binding to messages, session context and structure for attribute binding to session ID, structure for attribute binding to users, and correlation of incoming messages to in-progress activity, in tractable, easy to use system implementations that provide flexibility in interaction control and service blending.

Relevant prior art includes "servlets," an engine and API defined for web servers, and "SIP servlets," an engine and API based on servlets used for SIP servers. The service broker engine and API, which are designed for service interaction management and blending, have several important differences when compared to servlets and SIP servlets, the latter of which extends the concept of servlets. First, service broker steplets, unlike servlets and SIP servlets, are designed to have the ability to cooperate; servlets operate with a single servlet per message and SIP servlets have one or more SIP servlets that are independent of each other per message. As part of the novel service broker design, all the steplets that handle a message share the same set of message and session attributes. Steplets can use those attributes to share data. Another aspect of the design is that a steplet can determine if a previous steplet has already forwarded a given message to an Application Server. By contrast, SIP servlets are separate, independent applications. The SIP servlet engine forces SIP servlets to be separate and does not allow them to share information other than what is in the SIP message itself. Thus service broker steplets can cooperate or can be independent; the programmer may use either approach. With SIP servlets, however, the programmer does not have that flexibility of choice; if several SIP servlets handle one message, those SIP servlets must be independent.

A second important difference is that in the service broker, the list of steplets for a message is dynamic, in that any steplet can add steplets to the list at any time. Preferably the first steplet for a message will determine the user for that message, will retrieve that user's profile information from a separate user database, and will use that to determine the next steplet or steplets to handle the message. This technique is very flexible, and (given a high-capacity user database) can easily handle millions of users. By contrast, in a servlet engine a single servlet handles the message, and in a SIP servlet engine, the list of one or more servlets that handle a message is static. The SIP servlet administrator must configure this list by providing a set of XML deployment descriptors. For a SIP servlet engine, the SIP servlet administrator would have to extract user profile data from the appropriate database, convert it to the format required by the SIP Servlet engine, and then use the result to reconfigure the SIP servlet engine. At best, this would be a wasteful duplication of effort. Furthermore, SIP Servlet engines use a pattern-matching rule-based approach to determining the SIP servlet(s) for a message; these techniques do not scale up gracefully to handle millions of users.

A third important difference is that in the service broker, when referring to another steplet, e.g., when adding a steplet to a message's steplet list, a steplet simply uses the full class name of that steplet. If a steplet needs additional configuration data or parameters, it can obtain that data from a service provider's user database (or other databases). By contrast, in a servlet engine or SIP servlet engine, the administrator must provide an XML deployment descriptor for each servlet or SIP servlet, and must configure those descriptors into the servlet engine or SIP servlet engine. Each descriptor gives an internal name for the servlet or SIP servlet, the servlet's or SIP servlet's full class name, and optional additional configuration data. A drawback of this technique is that the administrator would have to extract this configuration data from the appropriate database and convert it to XML deployment descriptors. This would be an unnecessary and wasteful duplication of effort.

A fourth important difference is that the service broker engine provides a wait capability so that service broker steplets can wait for another message to arrive, thus releasing many of the resources needed to handle the steplet. Servlets and SIP servlets have no such facility.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION OF THE INVENTION

Figure 1:
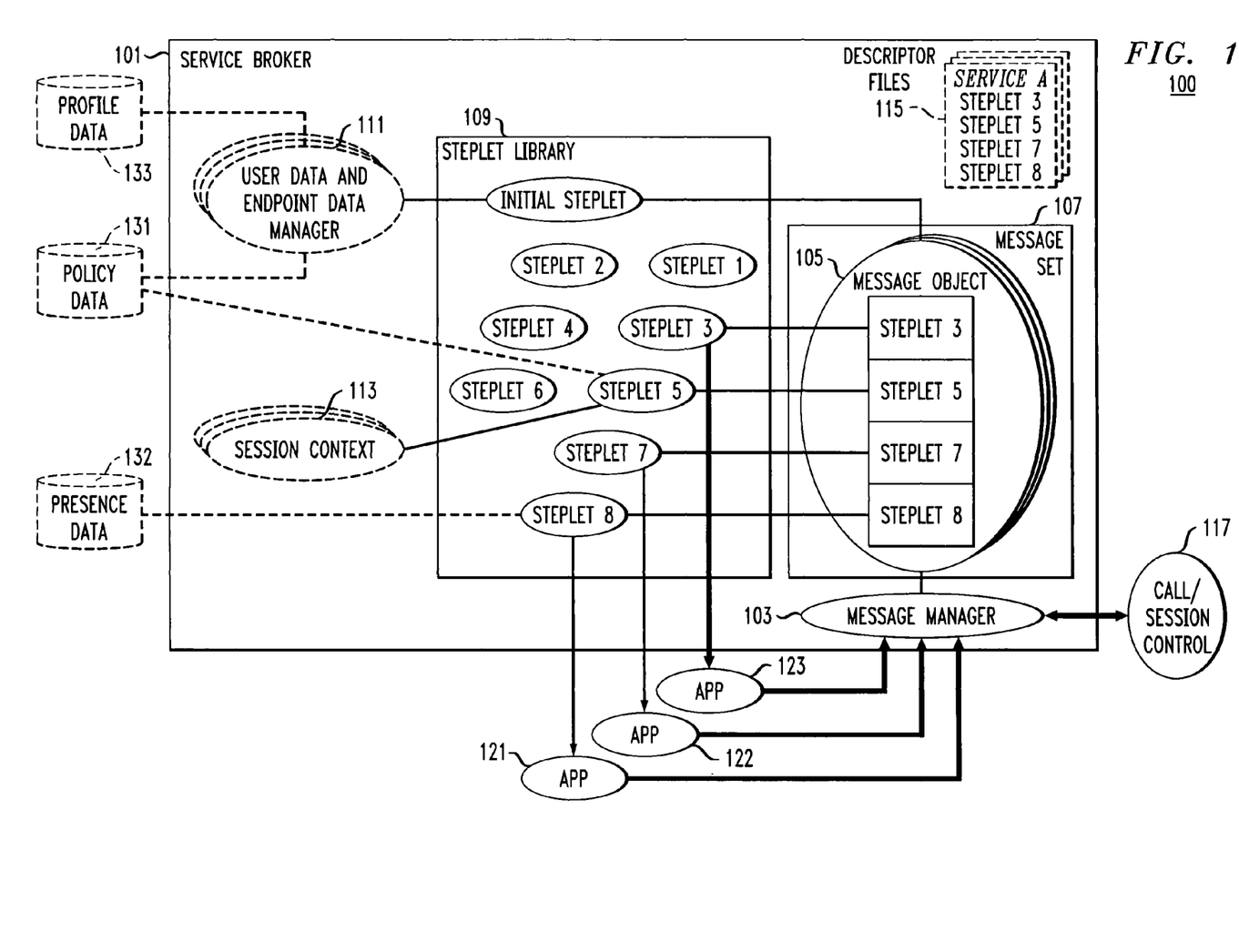
FIG. 1 is a service broker in accordance with an exemplary embodiment of the present invention.

FIG. 1 depicts a service broker 101 in accordance with an exemplary embodiment of the present invention. The service broker 101 includes a message manager 103, a message list 107 listing a number of current or active message objects 105 created and maintained by the manager 103, a steplet cache 109, a user data and endpoint data manager component 111, and a session context component 113 as shown in FIG. 1. Message Manager 103 is a module or component that stimulates action within the service broker 101 as a result of or in response to an incoming message. Message Manager 103 includes a message protocol stack, such as a SIP stack, and a dispatcher for the novel software elements called steplets that determine the feature interaction or service blending. Message Manager 103 creates a unique Message Object 105 for each request message received and appends it to the Message List. A Message Object 105 is created for each message received and all other information bound to that message, including the list of steplets for execution and any desired attributes. Message List 107 includes the list of all current Message Objects. Steplet and Class Cache 109 includes the steplets and classes that programmers extend, implement, or use directly. Session Context 113 is a structure for binding attribute data to session ID. User Data and Endpoint Data Manager 111 is a structure for obtaining user data and endpoint data, caching the data, and binding attribute data to user IDs. The data may be obtained from a Profile database 133. Service Descriptor files 115 comprise an optional mechanism that associates a steplet ID or a list of steplet IDs with a defined feature interaction or service blending.

The steplet engine supports the operation of steplets, including their appropriate initialization, etc., and the system 101 supports the ability to add new steplet functional components while the system is operational. The steplets also support the addition of new software to add to the logic or add interfaces to new applications. In addition, the operating environment of the steplet functional components provides thread resources with resources provided to wait while releasing the thread resources.

In the example embodiment, steplet is a customer-written class derived from a steplet base class defined by the steplet engine. Steplets can perform many functions, including forwarding a particular request to an application server, sending a response, such as busy or redirect, for a particular request, sending a particular response to the next hop, sending an original request to another server instead of forwarding the request upstream, contacting special non-SIP servers, such as a Presence Server 132, a Location Server, a Policy Server 131, a Web Server, a database, a media resource server, or any other server, via any form of RMI/RPC protocol. Steplets are designed to support dynamic sequencing: they can name their successor steplet and they can easily share attribute data by means of the attribute binding structures in the steplet engine. Further, steplets can wait for SIP messages without tying up thread resources by novel arrangement of capabilities within the steplet engine, specify the next steplet for a message, set or get attribute data, and implement service interaction control or service blending logic ranging from simple sequencing to the embodiment of complex algorithms or interfaces. From experience with the example embodiment, it is found that steplets can be quite compact, even for relatively complex operation. In the example embodiment, service broker 101 is SIP-based and provides the service Capability Interaction Manager (SCIM) functionality in IP Multimedia Subsystem and other Next Generation service architectures. In accordance with further aspects of the invention, another exemplary service broker 501 is illustrated and described in conjunction with FIG. 5 below, having a plurality of message managers, wherein the following description of exemplary service broker 101 applies to all other service broker systems illustrated and described herein except as noted below.

As shown in FIG. 1, the service broker 101 is operable to manage service interaction as well as to provide enhanced end user experience by blending applications with each other and with Presence, Location, and Policy functions, and by incorporating multi-session awareness. With the service broker 101, a minimal set of applications can be configured in a multiplicity of ways as its elements are brought into play, mixing and matching them with each other. In the example embodiment, the service broker API for supporting the degree of flexibility needed for service broker 101 to support unique service combinations is Java-based. The various functional sub-components in the steplet engine that are needed to enable these service broker capabilities are also Java-based, although this is not a strict requirement of the invention. Using the service broker API, service providers or their agents can incorporate service/application interaction and blending rules in Java programs that can be dynamically loaded into the service broker. The API enables maximum expressive freedom without restricting the creative talents of programmers needed to provide uniqueness and flexibility in interaction management, blending, and multi-session awareness. Providing an API based on standard Java gives the benefit of the excellent selection of off-the-shelf and open source Java IDEs, test environments, and other tools. The Java development shop used for providing the service broker programs can continue to use the tools (e.g., for editing and compiling) they find most productive; they do not need to learn and convert to a specialized set of tools (although a new library will need to be learned). Furthermore, steplets can re-use existing Java classes and packages: either standard packages, or custom packages that the customer has previously written. The goal of the API design is to facilitate rapid implementation of desired logic and usability by available Java programmers with no additional training (excepting familiarity with the API), and to allow programmers to re-use existing Java code.

In the example embodiments, a description of the operation of service broker 101 follows. Upon receipt of any SIP message, service broker 101 first involves Message Manager 103, which creates a Message object for the message and initializes the Message object's steplet list to contain the Default Steplet. Message Manager 103 marks the Message object as "Ready," which will eventually result in Message Manager 103 executing the Default Steplet on that message. The Default Steplet would typically be a steplet provided by the programmer using the API. The Default Steplet identifier is a configuration option. The function of the Default Steplet is to identify the steplets that are appropriate for the message and associated user and add the list of steplets to the Message object. In the example embodiment, this is done by pulling up user data by the User Data and Endpoint Data Manager 111. Service broker 101 executes the steplets on the list sequentially until no steplets remain. As noted, however, any steplet in the sequence can change the sequence. Steplets can mark a message as waiting, meaning that the steplet will continue to run on that message until it returns, but Message Manager 103 will not invoke the next steplet until the message is marked as ready. If a steplet sends out a SIP message, it marks the Message object as "Waiting." Typically, when a steplet sends a SIP message to an application server and waits for a response, the steplet forwards a copy of the message and marks the original message as waiting. Then the steplet returns. When the response message arrives at the service broker, a steplet invoked for the response message marks the original message as ready. This suspends work on the corresponding Message object after the steplet completes until a response message sets off a steplet that wakes up the Message object by marking it as Ready.

Service broker 101 orchestrates a set of transactions that begins with an initial request. The initial request is the request message that sets in motion the whole sequence of events that achieves a particular service interaction control or service blending. Upon receipt of an initial request, service broker 101 operates in the following manner. Message Manager 103 creates a Message Object 105 and dispatches the message as described above. In the example embodiment, steplets access Application Servers either via SIP or via some form of RPC protocol. If SIP is used, each message received will have its own Message object and unique message ID created by Message Manager 103. Service broker 101 links these messages to the other messages involved in the activity set off by the initial request. The steplets may modify copies of the messages in the corresponding Message objects as needed for sending on. Steplets access the User Data and Endpoint Data Manager 111 and the Session Context 113 as needed and correspondingly modify copies of the messages in the Message objects as needed, and may also add steplets to the Message objects as needed. After the Final Steplet executes, Message Manager 103 either disposes of the message by sending it to call control 117 or disposes of the message by discarding it, as determined by one of the Steplets. User Data and Endpoint Data Manager 111 is a per-(active) user component that obtains and may cache user data, endpoint status, and characteristics associated with the user. User Data and Endpoint Data Manager 111 obtains data identified by a "user" key. The data for each user consists of a set of name-value pairs, where the names are strings, and the values are arbitrary Java objects. Session Context 113 is a component where information obtained by steplets that needs to be persistent is stored. As used herein, the term "persistent information" refers to information that is retained over the life of the message, over the life of the associated dialog, or over an extended life. Session Context 113 caches data identified by a "session" key. The data for each session consists of a set of name-value pairs, where the names are strings, and the values are arbitrary Java objects. Descriptor files 115 may be used with the exemplary embodiment of the present invention, and each would include a list of steplets associated with a specific interaction control or blended service; the list of steplets would be read by Message Manager 203 and written in the associated Message Object. In accordance with an exemplary embodiment of the present invention, a pre-coded table determines steplets associated with each user although the means of identifying the steplet sequence can be altered by modifying the Default Steplet, for example to use descriptor files 115. Descriptor files 115 would be read by steplets and constructed to match the form expected by the steplet.

Figure 2:
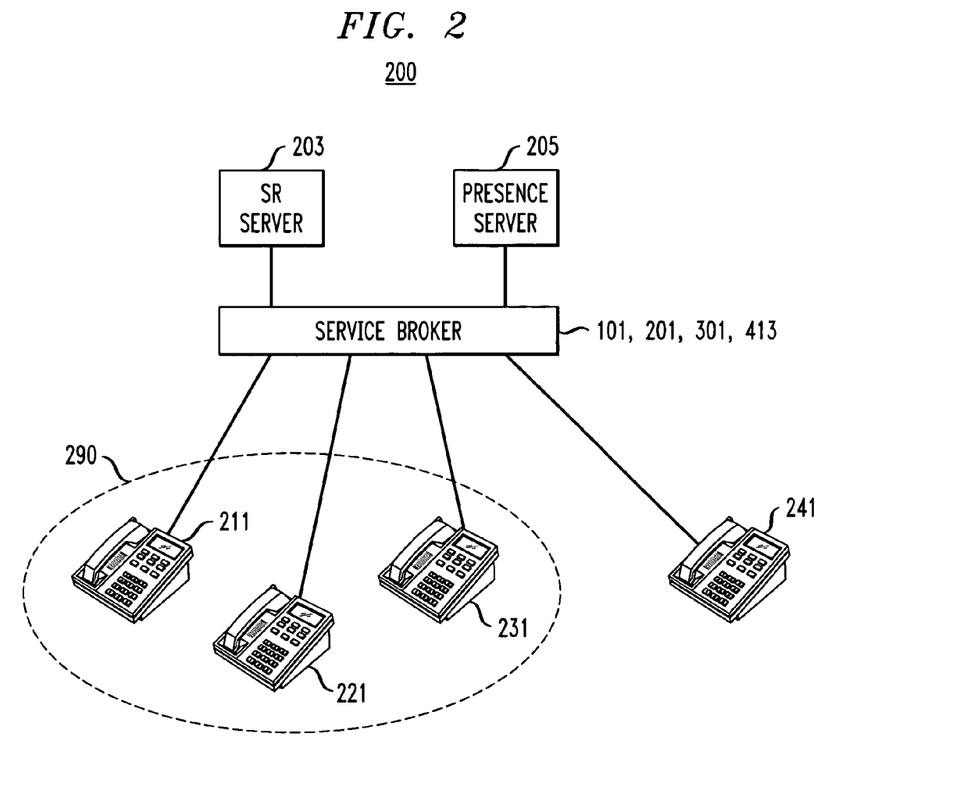
FIG. 2 depicts a logical representation of a service broker scenario in accordance with an exemplary embodiment of the present invention.
Figure 3:
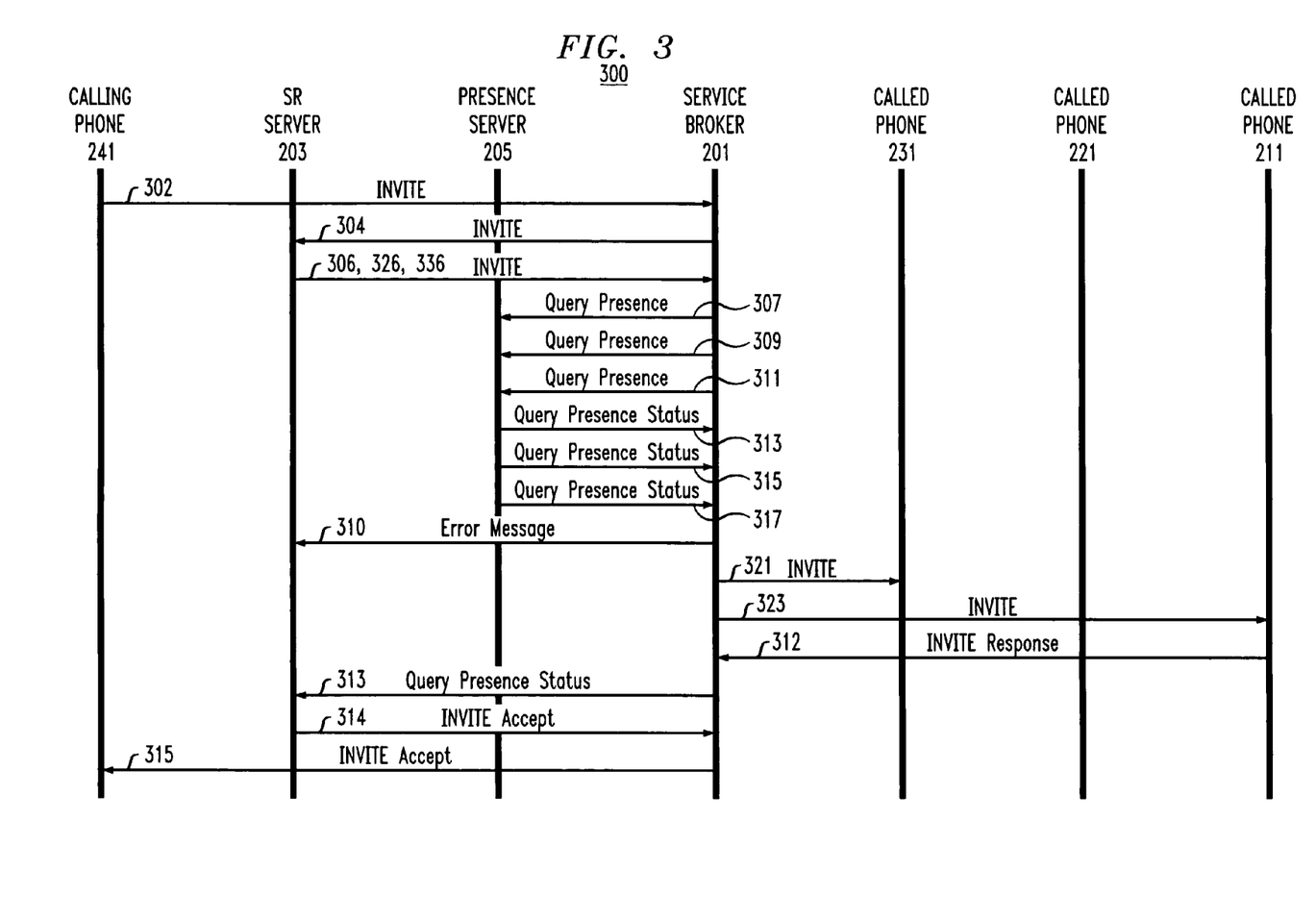
FIG. 3 depicts a call flow in accordance with an exemplary embodiment of the present invention.

FIG. 2 depicts a logical representation of a service broker scenario. Service broker 201 is disposed between a plurality of phones 211, 221, 231, and 241, and Simultaneous Ring (SR) Server 203 and Presence Server 205. In accordance with this exemplary embodiment, service broker 201 intercepts call requests intended for called phones in order to perform Simultaneous Ring and Presence: Check Presence Prior to Terminating service. An exemplary embodiment of this functionality is depicted in FIG. 3. Service broker 201 coordinates and controls multiple application servers first by selectively forwarding incoming SIP request messages to the application servers, and then by intercepting and modifying or re-routing the SIP requests those servers generate and the responses that they get. Thus service broker 201 is a cross between a proxy and a router. As an example, consider the Simultaneous Ringing (SR) service. Service broker 201 forwards the initial INVITE request to SR server 203, because the called party subscribes to SR service. SR server 203 then sends INVITE requests to the appropriate devices, and waits for their responses. Service broker 201 intercepts those INVITEs, and for each one, service broker 201 gets the target phone's status from the presence server. If the phone is on, service broker 201 forwards the INVITE to the device, generally via the S-CSCF, and eventually returns the device's response. However, if a phone is "off", instead of forwarding the INVITE, service broker 201 returns a "device not available" response to SR Server 203, thus terminating that branch. By functioning in this fashion, the service broker can prevent immediate diversion to voice mail, preventing answer from other telephones for cellular telephones that are off or out of range.

A steplet has the ability to append a steplet identifier to the steplet list associated with a Message object. Every steplet that is appended to the steplet list associated with a particular message object can add optionally defined parameters for this steplet. Steplet parameters are represented as name-value pairs where the name and value are strings and not arbitrary objects. Once the parameters are set, in the exemplary implementation, the steplet parameter object is passed to a class in order for the parameters to be associated with that particular steplet. In the exemplary implementation, a running steplet can access its parameters, but cannot change its parameters once they have been set.

In the exemplary implementation, the service broker assigns a unique string message ID to every message that arrives which serves as the message ID. A Message can be "READY" or "WAITING". A steplet can change the state of a message from READY to WAITING and vice versa. This is preferably the only way the Message state gets changed. But changing a message to WAITING does not immediately suspend processing of that message. Instead, if a steplet is running on that message, the steplet will continue until the returns. Thus marking a message as "WAITING" really means, "Do not start to execute this message's top Steplet but let the current, if any, running steplet complete." In the exemplary implementation, a steplet is considered done when the Steplet Manager removes it from the list or keeps it in a suspended state on the list. The default for the Steplet Manager is to remove the steplet from the list, but can also leave the steplet in a suspended state if instructed to do so by the steplet. This concept is useful when it is desired to suspend the steplet and wait for some condition to happen before continuing with the same steplet. For example, the steplet may be programmed to send a SIP message to an application server and re-invoke that same steplet upon the response from the application server.

In the exemplary implementation, the service broker includes a set of convenience methods that return information from the header of the SIP message. The service broker can receive multiple messages for a call. In fact, the service broker can receive multiple messages of the same type (i.e. INVITE) associated with the Initial Request. This is referred to as the spiral of messages. The basic idea is that as part of the spiral of messages, the Initial Request is the first message that kicked of the entry interaction with the service broker. A Secondary Request is a request that has spiraled back as a result of the Initial Request. The service broker correlates a secondary request to the initial request. The service broker can forward Request and Response messages on to an Application Server or device. In the exemplary implementation, the default action of the service broker is to forward a copy of the message onto the next hop and make the required SIP changes such as changing the Via header Max Forwards header and other required SIP headers. The service broker can be programmed to make additional changes to the SIP message. Once a message is forwarded it preferable would not be forwarded again by another steplet.

FIG. 3 depicts a call flow in accordance with an exemplary embodiment of the present invention. In this exemplary embodiment, a Simultaneous Ring and Presence: Check Presence Prior to Terminating service is depicted. In the embodiment depicted in FIG. 3, Simultaneous Ring (SR) set includes Called Phone 211, Called Phone 221, and Called Phone 231, and Called Phone 221 is turned off or otherwise not currently communicating with the communication system. The present invention provides a solution to the problem with a simultaneous ring function when a cell phone is off or an IP phone is unregistered and calls are thereby picked up by voice mail without other devices having time for answer. Calling phone 241 places a call to the phones in SR set 290, which in this example includes called phone 211, called phone 221, and called phone 231. Service broker 201 intercepts the INVITE message 302 from calling phone 241. Service broker 201 determines that the called phones in the SR set have SR service. This is done by accessing provisioned user data.

If the called phones have SR service, service broker 301 sends INVITE message 304 to SR Server 203. SR Server 203 determines the devices that are connected to the SR set. In an exemplary embodiment, SR Server 203 consults a database to determine each of the devices that comprise the SR set. SR Server 203 sends INVITE messages 306, 326, and 336 to service broker 201 for each device that is a member of the SR set. In this embodiment, SR Server 203 sends INVITE message 306 to Called Phone 211, INVITE message 326 to Called Phone 221, and INVITE message 336 to Called Phone 231. Service broker 201 receives INVITE messages 306, 326, and 336 and sends a corresponding Query Presence message to Presence Server 205. Query Presence message 307 queries the presence of Called Phone 211, Query Presence message 309 queries the presence of Called Phone 221, and Query Presence message 311 queries the presence of Called Phone 231.

Presence Server 205 determines the status of each device, Called Phone 211, Called Phone 221, and Called Phone 231. This is typically done via a query to a Home Location Register (HLR) or a database containing SIP registration. In this embodiment, Presence Server 205 determines that Called Phone 211 and Called Phone 231 are active, while Called Phone 221 is currently out of service. For each device, Presence Server 205 returns the status of the device to service broker 201. For Called Phone 211 Presence Server 205 sends Query Presence Status message 313, for Called Phone 221 Presence Server 205 sends Query Presence Status message 315, and for Called Phone 231 Presence Server 205 sends Query Presence Status message 317. For each reply from Presence Server 205, service broker 201 performs an appropriate action. For phones that are not in service, an error message is sent to SR Server 203. For called phones in the SR set that are available, an invitation message is sent to the appropriate phone.

In the embodiment depicted in FIG. 3, service broker 201 sends error message 310 to SR Server 203. Since Called Phone 211 and Called Phone 231 are in service, service broker 201 will invite them to answer the call. Service broker 201 sends INVITE message 321 to Called Phone 211 and sends INVITE message 323 to Called Phone 231. In the embodiment depicted in FIG. 3, Called Phone 211 is the first phone to answer the call request. Called Phone 211 sends INVITE Response message 312 to service broker 201. Service broker 201 sends INVITE Response message 313 to SR Server 203. SR Server 203 responds with an INVITE accept message 314 sent to service broker 201. Service broker 201 sends INVITE Accept message 315 to calling phone 241, thereby completing the call setup and establishing the session. In an exemplary embodiment, SR Server 203 sends cancel messages to the two called phones that do not answer the call. These cancel messages are preferably routed through service broker 201.

Several variations of the described application of the invention are possible, including but not limited to checking presence prior to alerting any phone to bypass its voice mail and checking presence during Find-Me-Follow-Me (FMFM) service. In the latter case, the service broker checks presence on calls to be passed on from FMFM to reduce delay in locating the user and reduce use of network resources.

Figure 4:
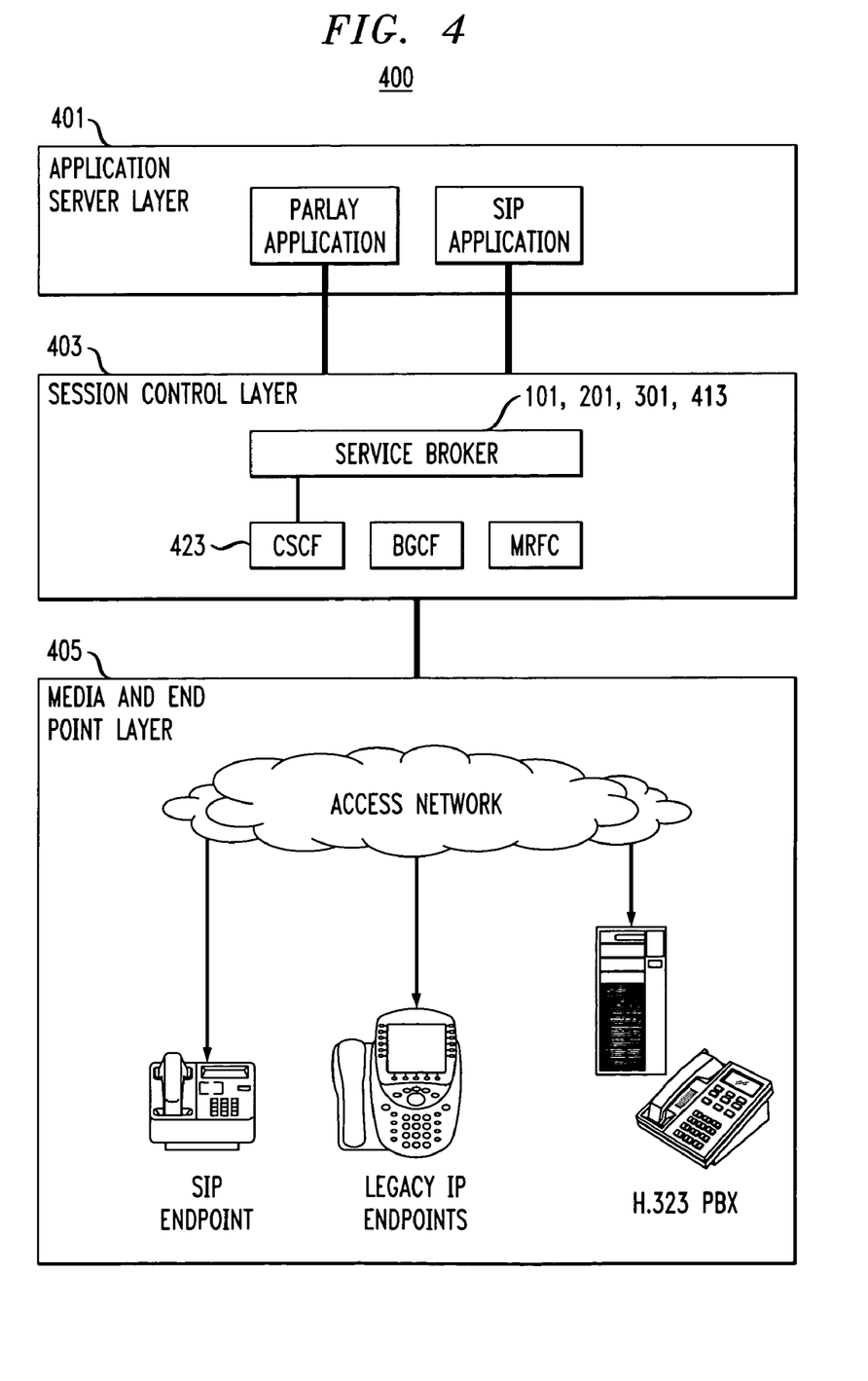
FIG. 4 depicts a communication system in accordance with an exemplary embodiment of the present invention.

FIG. 4 depicts a communication system 400 in accordance with an exemplary embodiment of the present invention. Communication system 400 is an IMS Architecture that comprises three layers, Application Server Layer 401, Session Control Layer 403, and Transport & Endpoint Layer 405. Similar to communication system 100, if multiple application servers provide services for end users, then some additional functionality may be required to combine and/or broker these services. Service broker 413 provides this functionality. Service broker 413 functionality fills a role that is referred to as the service Capability Interaction Manager (SCIM) in the IMS architecture. This service architecture can simultaneously support many different real-time communication applications. However, additional service interworking or service brokering is needed to blend services and control service interaction. Service broker 413 resides between the core session layer and Application Server Layer 401, and has corresponding interfaces to the applications. This provides critical functionality such as integrating multiple applications into meaningful service offerings, allowing participating applications to be unaware of each other, and providing programmability with an application programming interface (API) for combining services.

Communication system 400 indicates a logical representation of functions. Service broker 413 resides between Call Session Control Function (CSCF) proxy server 423 and the application servers. However, there are options in the physical embodiment of this architecture. The actual functionality of the service broker systems of the invention can be provided in one or more system components and may reside on an individual physical entity or may be co-located with another function or functions on a single physical entity. Examples would be to co-locate the service broker with the CSCF (or SoftSwitch in pre-IMS architectures), with a gateway (such as the Open Systems Architecture (OSA)/Parlay gateway), or with an application on an application server. It is also conceivable that some service brokering could be performed simultaneously in all these locations in a partitioned manner. The session control portion of the IMS architecture is Session Initiation Protocol (SIP) centric, in that the protocol of choice used while communicating between elements in Session Control Layer 403 is SIP. As such, the interface from service broker 413 to the CSCF 423 is SIP.

A key aspect of the exemplary embodiment depicted in FIG. 4 is that the IMS architecture is equally suitable for wireless, wireline, and converged networks. Service broker 413 is fully consistent with this aspect of the IMS architecture as it is inherently endpoint/access neutral. Service broker 413 also enriches the IMS architecture in that service broker 413 manages the integration and coordination of services to control service interaction and/or to provide enriched end-user experiences. Further, service broker 413 accommodates users who can span different endpoints, such as analog, softphones, or wireless phones, and can customize service presentation based on the user's endpoint capabilities, such as voice only, voice/data, or voice/data/multimedia. Service broker 413 can save and use variable user data and session context data to achieve multi-session awareness and manage simultaneous and sequential context-sensitive interactions.

In addition to the "service blending" capability, service broker 413 can be used to share network services such as media servers across multiple applications by intercepting their commands and adapting them to a selected media server command interface, although other components in the IMS architecture could provide such sharing. Also, service broker 413 may, in conjunction with other systems in the maintenance infrastructure, bring about the consolidation of information for billing and operations support systems and an abstracted view to the other elements in the network. Service broker 413 functionality can be implemented in a non-SIP environment, such as a web services environment, providing that the following conditions of service blending can be utilized. A first condition is that multiple applications need to act on the same event/message. A second is that pre-defined, but programmable, logic, which has been referred to as corresponding to a "service package", would designate how the event/message and subsequent messages are dispatched and defines a specific composite service, made up of the action and interaction of subtending applications, potentially as well as application capabilities such as Presence, Location, and Policy. The novel service broker invention would facilitate the addition of the corresponding code. In this usage, session contexts may be created by the logic as supported by the service broker. Session contexts would serve as execution-time entities that keep the context information for related user activity. Session contexts are preferably multiple session aware, see all the associated events and messages, and are used by the service Packages for feature interaction control. In this usage, interface code can be incorporated in steplets to accommodate applications with differing interfaces, such as HTTP, Java DataBase Connectivity (JDBC), and other remote procedure call (RPC)-based protocols.

Figure 5:
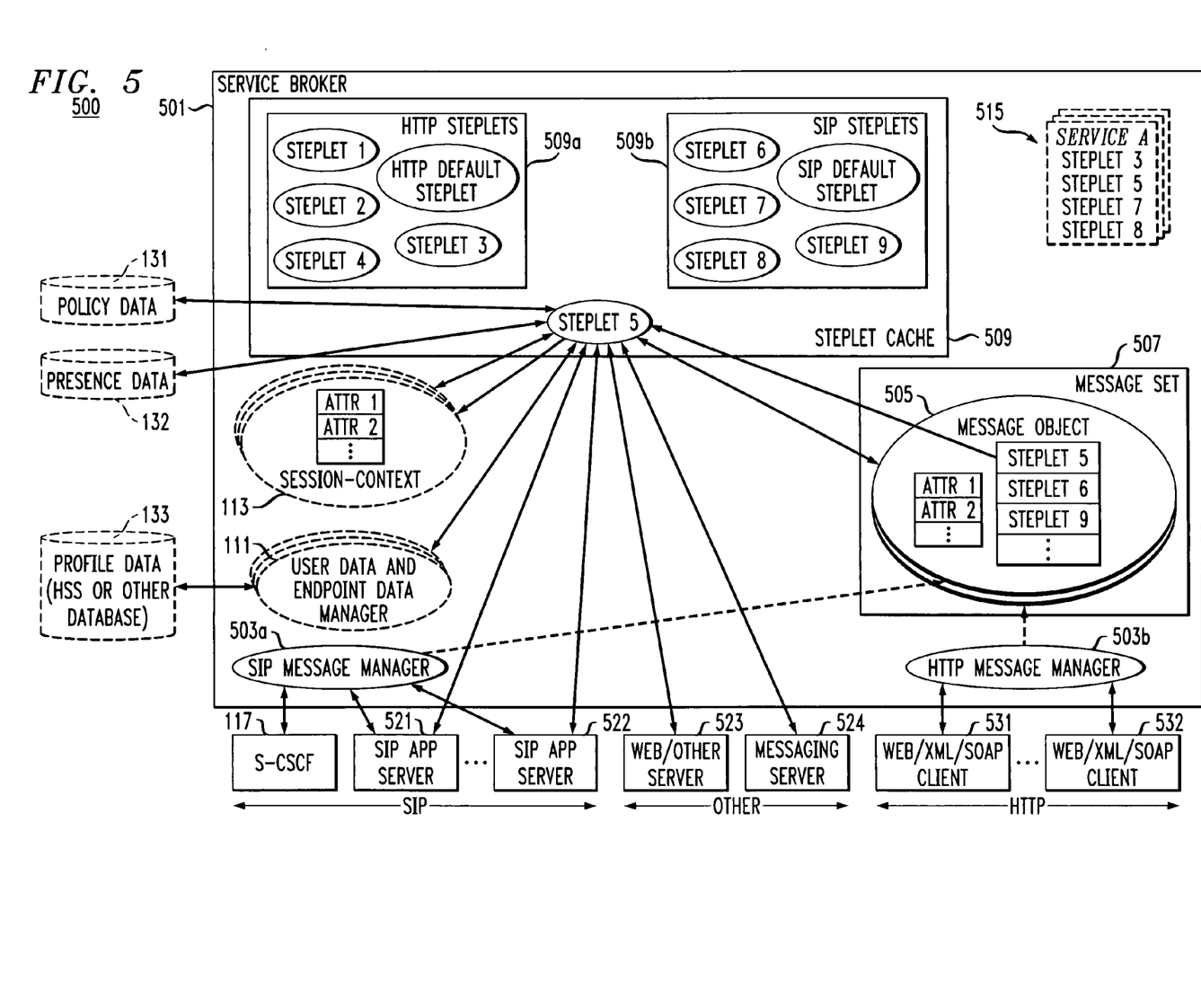
FIG. 5 depicts another exemplary service broker with a plurality of message managers in accordance with the invention.

Referring also to FIG. 5, a communications system 500 is illustrated with another exemplary service broker system 501 in accordance with the present invention, which includes a plurality of message manager components 503 and a plurality of steplet cache subcomponents 509, and is otherwise functionally the same as broker 101 illustrated and described above. Service broker system 501 is comprised of a number of message managers 503 including an exemplary SIP message manager component 503a (e.g., similar to the message manager component 103 described above in connection with FIG. 1) and an exemplary HTTP message manager component 503b handling HTTP messages, wherein any number of suitable message manager components 503 may be included in the service broker system 501. A message set 507 is provided with a list of current or active message objects 505 created and maintained by the managers 503, along with a steplet library or cache 509 comprised of one or more HTTP steplets 509a and SIP steplets 509b. The steplet functional components 509a and 509b operate in a manner described above with respect to the steplets components 109 in FIG. 1, each steplet 509 being able to designate another steplet functional component 509 to execute as a successor to itself, where one or more of the steplet components 509 have logic that determines a desired mediation for feature interaction or service blending associated with an event or message, as described above. The exemplary service broker system 501 also provides a user data and endpoint data manager component 111 operable to obtain user data and endpoint data and to bind attribute data to a user ID associated with a current service session, as well as a session context component 113 for binding attribute data to session ID associated with the current service session as described above. Each of the message manager components 503a and 503b is a module or component that stimulates action within the service broker system 501 in response to an incoming message or event, where message manager component 503a is operable in response to SIP messages as described above and HTTP message manager component 503b is responsive to HTTP messages. The message managers 503a and 503b, moreover, are operative to create unique message objects 505 for corresponding received request messages or events, which are then added to the message list 507. The message managers 503 also provide steplet dispatching functionality, wherein broker system 501 provides service interaction management and service blending by blending applications with each other and with Presence, Location, and Policy functions, and by incorporating multi-session awareness. As with the above example, service broker 501 can be adapted to provide SCIM functionality in an IMS systems along with other next generation service architectures, although the invention is not limited to IMS systems and can bridge IMS systems and other systems for blending services from multiple systems.

As in the above described system of FIG. 1, the service broker 501 of FIG. 5 orchestrates a set of transactions that begins with an initial request. The initial request is typically a SIP or HTTP request message, but can be any initiating message or event that has a corresponding message manager. The request begins a sequence of events that implements a desired service interaction control and/or service blending by dispatching a steplet. In operation as a SCIM in the IMS example, broker system 501 can operate as an extensible router for SIP messages, with calls to customer-provided code that decides what do to with a received SIP message, such as whether to route the message to an application server, such as a SIP application server 521 or 522, a web or other type server 523, etc., or whether to change the received message, reply to it, etc. In accordance with another aspect of the invention, moreover, the exemplary service broker system 501 is operable to respond or react to independent or apparently independent HTTP requests, or other types of request messages or events, by the provision of a plurality of corresponding message manager components 503, in this example, through inclusion of the HTTP message manager component 503b, in order to provide enhanced flexibility with respect to service interaction and blending. Moreover, the exemplary service broker system 501 is able to link messages of various types together via message ID (associated with a Message object), call ID (stored in a Message object), or a session ID (associated with a Session Context). Note that message ID and session ID values are internal to the service broker, whereas call ID values are external, being generated by the device or system initiating the call. The service broker engine provides the capability to identify Message objects containing a specific call ID. These flexibilities facilitate advanced service blending, for example, wherein a subscriber could respond to internet based instant messaging by clicking a link in the message, which would then cause an HTTP request message to be sent to the service broker system 501, for instance, via a web/XML/SOAP client server 531, 532, and the HTTP message manager 503b. The HTTP request message would contain message ID, call ID, or session ID that the service broker would use to link the HTTP message to an existing message or session.

Service broker system 501 thus mediates events or messages to be sent to or received from a plurality of applications residing on CSCF 117, servers 521-523,531,532, etc., in order to control service interaction and/or to provide service blending in a communications system, using the steplet functional components 509 that operate to determine a desired mediation for feature interaction or service blending, where the appropriate message manager 303 operates in response to the incoming events or messages to dispatch the steplet functional components and to create and manage the corresponding message objects 505 using the user and end point data manager component 111 to obtain user data and endpoint data and to bind attribute data to a user ID associated with a current service session, and using the session context component 113 to bind attribute data to session ID associated with the current service session. In this regard, the service broker systems of the invention may include any number of message manager components 303 to process any message/event types, including but not limited to those associated with SIP, HTTP, SOAP or XML, specialized XML, J2CA, GDI, TCAP, etc. Moreover, the operating environment of the steplet functional components 508 of system 501 supports the ability to add new steplets 509 to the system while it is operational and provides thread resources. The service broker system 101, 501 provides a means to wait while releasing the thread resources, and the steplets 509 preferably support the addition of new software to add to the logic or add interfaces to new applications. System 501 also provides for sharing information related to arbitrary session entities that are created and designated by the steplet functional components 509.

Figure 6:
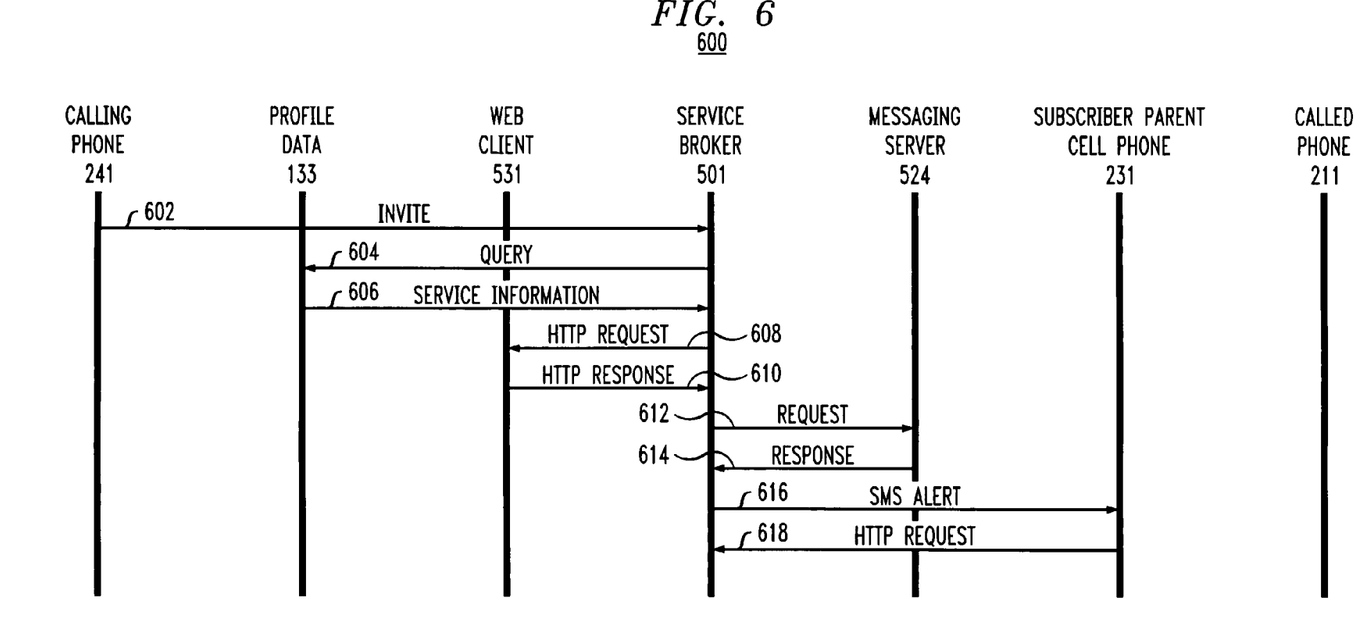
FIG. 6 depicts another exemplary call flow in accordance with the present invention.

FIG. 6 depicts another exemplary call flow 600 using the multiple message manager broker system 501 of FIG. 5 in accordance with an exemplary embodiment of the present invention. The call flow 600 illustrates an example in which a subscriber has outgoing call parental call messaging alert service with a specified phone number or set of numbers for parental control alerts and controls. In this example, a parent user subscribes to the messaging alert services with respect to a home telephone 241 in FIG. 2 using the exemplary service broker 501 of FIG. 5, and has specified the list of alert numbers for which notification and control is desired to the service provider. As shown in FIG. 6, with the parent away from home, a child of the household makes a phone call from calling telephone 241 to an identified alert number associated with called phone 211, resulting in a SIP INVITE message 602 from phone 241. The service broker system 501 queries the associated user database 133 via a query message 604 and in return receives the subscriber's information via service information message 606. The service broker 501 intercepts the INVITE message 602 via the SIP message manager component 503a (FIG. 5), which also creates a corresponding message object 505 and matches the information from the message 602 with the subscriber information from message 604 as service broker transparent data. The subscriber information in this case includes or otherwise indicates a SIP steplet component 509b (e.g., steplet 5 in FIG. 5) that is invoked with the phone number(s) as parameter(s). Having identified a match, a steplet operating within the service broker system 501 queries an external web service 523 (FIG. 5) using an HTTP request message 608 with the called number of phone 241 as a parameter, and the steplet receives called name and address information, if available, by an HTTP response 610. A steplet operating within service broker 501 also queries a messaging server 524 by sending a request message 612 to the messaging server 524 with the calling telephone number as a parameter, requesting that a Short Message System (SMS) alert 616 be sent to the subscriber parent cell phone 231, to which the server 524 may send a response 614. The SMS 616 is received by the parent subscriber, and includes the called number, and any additional information such as called name and address. The subscriber parent then clicks on an embedded link in the SMS alert message 616 to cancel the call, which causes an HTTP message 618 to be sent to the HTTP message manager operating in service broker 501. The HTTP message includes the message ID or session ID associated with the attempted call, and the service broker 501 thereupon cancels the attempted call by sending an error message. It can be appreciated from this example that provision of multiple message managers 503 facilitates a wide spectrum of service blending and feature interaction to further enhance the advantages of the above described service broker systems 101, 201, 301, 413.

The invention has been illustrated and described with respect to one or more exemplary implementations or embodiments. However, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A service broker system for mediating events or messages to be sent to or received from a plurality of applications to control service interaction and to provide service blending in a communications system that supports service interaction/blending for services that include communication services and web services, the service broker system comprising:

a plurality of steplet functional components individually implemented using at least one processor and configured to designate another steplet functional component to execute as a successor to itself, at least one of the steplet functional components including logic that determines a desired mediation to provide feature interaction or service blending associated with an event or message;

a sharing component implemented using the at least one processor and configured to share information related to individual events or message between the steplet functional components; and a receiving component implemented using the at least one processor and configured to receive the events or messages, to associate the contents of the events or messages with the information sharing means, and to designate which steplet functional component will execute initially for each event or message, the receiving component comprising a message manager component configured in response to one or more events or incoming messages, the message manager component comprising a dispatcher for the steplet functional components, wherein the message manager component creates and maintains a unique message object for a received request message, the message object comprising information bound to the message including a list of steplet functional components for execution and any desired attributes.

2. The system of claim 1, wherein the steplet functional components are constructed, at least partially, using software.

3. The system of claim 2, wherein an operating environment of the steplet functional components supports the ability to add new steplet functional components to the system while it is operational.

4. The system of claim 2, wherein the steplet functional components support the addition of new software to add to the logic or add interfaces to new applications.

5. The system of claim 2, wherein an operating environment of the steplet functional components provides thread resources and wherein a means is provided to wait while releasing the thread resources.

6. The system of claim 1, wherein the events or messages are Session Initiation Protocol (SIP) messages.

7. The system of claim 2, wherein the events or messages are Session Initiation Protocol (SIP) messages.

8. The system of claim 1, wherein the sharing component is configured to share information related to arbitrary session entities that are created and designated by the steplet functional components.

9. A service broker system for mediating events or messages to be sent to or received from a plurality of applications to control service interaction and to provide service blending in a communications system that supports service interaction/blending for services that include communication services and web services, the service broker system comprising:

a plurality of steplet functional components individually implemented using at least one processor and configured to designate another steplet functional component to execute as a successor to itself, at least one of the steplet functional components including logic that determines a desired mediation to provide feature interaction or service blending associated with an event or message;

a sharing component implemented using the at least one processor and configured to share information related to individual events or message between the steplet functional components; and a receiving component implemented using the at least one processor and configured to receive the events or messages, to associate the contents of the events or messages with the information sharing means, and to designate which steplet functional component will execute initially for each event or message;

wherein the receiving component comprises a plurality of message manager components individually configured in response to one or more events or incoming messages, the message manager components individually comprising a dispatcher for the steplet functional components, wherein the message manager component creates and maintains a unique message object for a received request message, the message object comprising information bound to the message including a list of steplet functional components for execution and any desired attributes.

10. The system of claim 1, wherein the sharing component comprises a message object associated with a received request message, the message object comprising information bound to the message including a list of steplet functional components for execution and any desired attributes.

11. A service broker system for mediating events or messages to be sent to or received from a plurality of applications to control service interaction and to provide service blending in a communications system, the service broker system comprising:

plurality of steplet functional components individually implemented using at least one processor and configured to designate another steplet functional component to execute as a successor to itself, at least one of the steplet functional components including logic that determines a desired mediation to provide feature interaction or service blending associated with an event or message;

a message manager component implemented using the at least one processor and configured in response to one or more events or incoming messages, the message manager component comprising a dispatcher for the steplet functional components, wherein the message manager component creates and maintains a unique message object for a received request message, the message object comprising information bound to the message including a list of steplet functional components for execution and any desired attributes;

a message set including a list of current message objects;

a user and end point data manager component implemented using the at least one processor and configured to obtain user data and endpoint data and to bind attribute data to a user ID associated with a current service session; and a session context component implemented using the at least one processor for binding attribute data to a session ID associated with the current service session.

12. The system of claim 11, comprising a plurality of message manager components individually associated with a different message type.

13. The system of claim 12, wherein the plurality of message manager components comprises:

a Session Initiation Protocol (SIP) message manager component configured in response to incoming SIP messages; and a Hypertext Transfer Protocol (HTTP) message manager component configured in response to incoming HTTP messages.

14. The system of claim 12, wherein the plurality of message manager components comprises a Session Initiation Protocol (SIP) message manager component configured in response to incoming SIP messages.

15. The system of claim 12, wherein the plurality of message manager components comprises a Hypertext Transfer Protocol (HTTP) message manager component configured in response to incoming HTTP messages.

16. The system of claim 11, wherein an operating environment of the steplet functional components supports the ability to add new steplet functional components to the system while it is operational.

17. The system of claim 11, wherein the steplet functional components support the addition of new software to add to the logic or add interfaces to new applications.

18. The system of claim 11, wherein an operating environment of the steplet functional components provides thread resources and wherein a means is provided to wait while releasing the thread resources.

19. The system of claim 11, further comprising a means for sharing information, which is related to arbitrary session entities that are created and designated by the steplet functional components.

20. The system of claim 11, further comprising means for sharing information by an external parameter, and means for searching message objects by the external parameter.

* * * * *